United States Patent
Bradford et al.

(10) Patent No.: US 6,262,135 B1
(45) Date of Patent: Jul. 17, 2001

(54) POLYURETHANE FOAM CONTAINING A BLEND OF MONOMERIC AND OLIGOMERIC FLAME RETARDANTS

(75) Inventors: Larry L. Bradford, Danbury, CT (US); Emanuel Pinzoni, Hawthorne, NJ (US); Barbara A. Williams, New York, NY (US); Theodore Halchak, Upper Montclair, NJ (US)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/291,153

(22) Filed: Apr. 12, 1999

(51) Int. Cl.[7] ............... C08J 9/04; C08K 5/52; C08K 5/51
(52) U.S. Cl. .......... 521/107; 521/155; 521/168; 521/169; 521/170; 521/906
(58) Field of Search ................ 521/107, 155, 521/168, 169, 170, 906

(56) References Cited

U.S. PATENT DOCUMENTS

| | | | |
|---|---|---|---|
| 3,891,727 | * 6/1975 | Weil | 521/107 |
| 3,956,200 | 5/1976 | Biranowski | 521/108 |
| 4,133,846 | * 1/1979 | Albright | 521/107 |
| 4,194,068 | * 3/1980 | Miller et al. | 521/107 |
| 4,273,881 | 6/1981 | Otten | 521/108 |
| 4,382,042 | 5/1983 | Hardy et al. | 558/115 |
| 4,458,035 | * 7/1984 | Hardy et al. | 521/107 |
| 4,746,682 | * 5/1988 | Green | 521/107 |
| 5,086,082 | * 2/1992 | Stone | 521/107 |
| 5,157,056 | 10/1992 | McGovern | 521/107 |
| 5,164,417 | 11/1992 | Anderson | 521/107 |
| 5,547,614 | 8/1996 | Fesman et al. | 252/609 |
| 5,608,100 | 3/1997 | Sicken | 558/164 |
| 5,672,645 | 9/1997 | Eckel et al. | 524/127 |
| 5,679,288 | 10/1997 | Kim et al. | 252/609 |
| 5,985,965 | * 11/1999 | Sicken et al. | 521/107 |

FOREIGN PATENT DOCUMENTS

| | | |
|---|---|---|
| 255381 | 2/1988 | (EP) . |
| 428221 | 5/1991 | (EP) . |
| 640655 | 3/1995 | (EP) . |

* cited by examiner

*Primary Examiner*—Rabon Sergent
(74) *Attorney, Agent, or Firm*—Richard P. Fennelly

(57) ABSTRACT

A flame retardant blend is disclosed that comprises: (a) a monomeric halogenated organic flame retardant that is adapted for use in a polyurethane foam formulation; and (b) an oligomeric organophosphate flame retardant having a phosphorus content of no less than about 10%, by weight, and at least three phosphate ester units therein, the amount of (a) in the blend being no less than the amount of (b). It is useful in polyurethane foams.

7 Claims, No Drawings

POLYURETHANE FOAM CONTAINING A BLEND OF MONOMERIC AND OLIGOMERIC FLAME RETARDANTS

BACKGROUND OF THE INVENTION

A wide variety of disclosures exist in regard to flame retardant additives for polymers, such as polyurethane foams. Two representative examples of disclosures of this type, which relate to blends of two differing flame retardant additives, include the following:

U.S. Pat. No. 4,273,881 to J. G. Otten describes the use of a 50:50 mixture of flame retardant A, sold under the trademark ANTIBLAZE 19, and bis-(2-chloroethyl)-2-chloroethyl-phosphonate (See Col. 9, lines 61–62).

U.S. Pat. No. 3,956,200 to J. Biranowski describes the use of flame retardant blends comprising a polyglycol hydrogen polyphosphonate and an additive, non-reactive flame retardant in a ratio of from about 20:1 to 1:1, preferably from about 5:1 to 1:1.

In addition to the foregoing patent disclosures, certain blends of monomeric and oligomeric flame retardants have also been sold to the polyurethane industry, including compositions carrying the trademarks FYROL® 25 and FYROL® EFF of Akzo Nobel Chemicals Inc. The product sold under the former mark included an oligomer that contained a blend of both phosphate and phosphonate moieties, whereas the product sold under the latter mark contained a major amount (about 66%) of the oligomeric component and a minor (about 32.5%) of the monomeric flame retardant component.

SUMMARY OF THE INVENTION

The present invention relates to a flame retardant blend comprising: (a) a monomeric halogenated organic flame retardant that is adapted for use in a polyurethane foam formulation; and (b) an oligomeric organophosphate flame retardant having a phosphorus content of no less than about 10%, by weight, and at least three phosphate ester units therein, the amount of (a) in the blend being no less than the amount of (b). The use of this blend in polyurethane foam compositions forms another aspect of the invention.

DESCRIPTION OF THE PREFERRED EMBODIMENTS

The monomeric halogenated flame retardant that forms one essential component of the blends of the present invention are those flame retardants additives that have hitherto been used in conferring flame retardancy on polyurethane foams (especially flexible polyurethane foams).

One representative class that can be selected include the halogenated phosphate esters containing from about 1 to about 5 carbon atoms in their alkyl groups. Representative additives include: tris(dichloropropyl) phosphate; tris(2-chloroethyl)phosphate; tris(dibromopropyl) phosphate; tris(bromochloropropyl)phosphate; and the like. In addition, a polybrominated diphenyl oxide-containing additive can be selected, such as one comprising pentabromodiphenyl oxide (e.g., about 65% to about 85% of pentabromodiphenyl oxide and about 15% to about 35% of an aryl phosphate). The amount of such additive in the blend will range from about 50% to about 95%, by weight of the blend, more preferably from about 60% to about 90%.

The second component of the blend is an oligomeric organophosphate flame retardant having a phosphorus content of no less than about 10%, by weight, and at least three phosphate ester units therein (at least two phosphate ester repeat units and a phosphate capping unit). The amount of this additive in the blend will range from about 5% to about 50%, by weight of the blend, more preferably from about 10% to about 30%. A representative additive of this type is generally described in U.S. Pat. No. 4,382,042 to T. A. Hardy with the non-halogenated versions being preferred (e.g., especially the ethyl group-containing composition). These oligomers can be formed by reacting phosphorus pentoxide with the selected trialkyl phosphate (e.g., triethyl phosphate) to form a polyphosphate ester containing P—O—P bonds that is then reacted with epoxide (e.g., ethylene oxide) to form the desired product. This oligomeric organophosphate flame retardant is preferably of the formula:

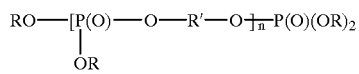

where n (which designates the "repeat" phosphate ester units) can range, on a number average basis, from 2 to about 20, preferably from 2 to about 10, and R is selected from the group consisting of alkyl, haloalkyl and hydroxyalkyl and R' is alkylene. The alkyl and alkylene groups will generally contain from about two to about ten carbon atoms.

Especially preferred oligomeric polyphosphates for use herein will comprise ethyl and ethylene groups as the alkyl and alkylene moieties, will have a hydroxy functionality of no more than about 30 mg KOH/g, will have an acid number of no more than about 2.5 mg KOH/g, and will have a phosphorus content that ranges from about 17% to about 24%, by weight.

The flame retardant blend of this invention can be added to the selected polyurethane foam formulation at from about 2 to about 35 parts by weight of the blend per 100 parts by weight of the polyol that is in the formulation. The weight percent phosphorus that is in the final polyurethane foam formulation will range from about 0.25 wt % to about 3.5 wt %. The foregoing type of flame retardant blend is especially adapted for use in flexible and rigid polyurethane foams and, in certain embodiments (e.g., at ratios of from about 1:1 to about 20:1 of the monomeric additive:oligomeric additive) in typical polyester polyurethane flexible foams, have shown unexpectedly greater efficiency of the blend as compared to the additive sums of the individual components thereof. This performance is especially attractive since the oligomeric material is typically much more expensive than the monomeric material making cost efficiency of the blend particularly beneficial.

The density of the foam is an important factor. In general, the higher the density, the less flame retardant additive required to pass the flame test. The addition of the blended product is more enhanced with this rule. For example, the present blend when at a 3:1 ratio will pass the TB117 test in a 1.0 pcf density foam at 14 parts per hundred. The same blend will meet the TB117 test in a 1.8 pcf density foam at 6 parts per hundred.

A blend of two phosphorus containing products differing in efficiency (as measured by parts required to pass a given test) can be further compared by, parts of phosphorus required to pass a given test. For blends of these two products it is expected that the phosphorus requirement to pass said test will fall between the two. If less phosphorus is required for the blend than for either Individual product, it is clearly synergistic/advantageous. For example (from Example 9–19), additive product A, a monomeric halogenated flame retardant requires 0.99% of phosphorus to pass the TB117 test, and product B, an oligomeric organophosphate flame retardant requires 0.95% phosphorus to meet the TB117 test. The blend of the two products in a 3:1 ratio requires 0.60% phosphorus in a 1.8 pcf density foam.

U.S. Pat. No. 3,956,200 is incorporated herein (see, for example, Col. 6, line 25 to Col. 8, line 15) to illustrate how such flexible foams, which are preferred, can be made.

The foregoing invention is further illustrated by the Examples that follow.

EXAMPLES 1–8

The following flame retardant test data were generated using a typical polyether polyurethane flexible foam that was tested at nominal densities of 1.0, 1.5, and 1.8 pounds per cubic foot (pcf). The formulation used to form the foam was formed using a polyether polyol having a hydroxyl number of 56, a water level of from 3.55% to 5.6%, an amine level of about 0.25%, and an NCO index of 110.

The following standard tests were employed:

A. Cal.TB 117 A Test: This test is a small-scale vertical test with a twelve-second-ignition time. The sample size was 12"×3×½". The ignition source was removed after twelve seconds. A second clock is started if the sample continues to burn. The criteria for failing included: a sample exceeding an individual burn of eight inches or an average burn of six inches. The time criteria required that an individual specimen would not have an individual afterflame or afterglow exceeding ten seconds or an average afterflame or afterglow exceeding five seconds.

B. Cal.TB 117 D Test: This test is a smoldering test in is which a cigarette is used as the ignition source under a cotton cloth cover. The foam sample was covered with a standard velvet cotton cloth and was placed in a small wooden frame to form a mock chair. The back of the sample was 8"×7"×2", and the seat was 8"×4"×2". The sample was preweighed before testing and was again weighed after the test was finished. If the foam lost more than 20% of its weight, it was judged to be a failure.

C. MVSS 302 Test: This test is a horizontal flame test that is used as a guideline for automobile manufactures. The sample size was 14"×4"×½". There is a line 1½" from the ignition point. A flame was ignited for fifteen seconds. The ignition source was then turned off and the sample was rated. A "DNI" rating indicates that the sample did not support combustion ("did not ignite"). A rating of "SE" indicates that the sample ignited but did not burn to the timing zone, which is a point starting from the 1½" mark to the 3½" line. A rating of "SENBR" indicates that the sample burned past the 1½" line but was extinguished before the 3½" mark. A rating of "SE/B" indicates that a sample burned past the 3½" mark but was extinguished before the endpoint. An inch per minute rate was then calculated. The burn rate indicates that a sample burned passed the 3½" mark. An indication of a burn rate or an SE/B rating that was higher than 4.0 in/min indicates failure in accordance with this test. For this study a minimum performance of SENBR was required.

A number of flame retardant additives were used in TB-117 and MVSS 302 tests in a variety of foams, either alone or in combination, as further described below. They were: tris(dichloropropyl) phosphate, available under the trademark FYROL® FR-2 from Akzo Nobel Chemicals Inc.; a blend of 75% pentabromodiphenyloxide and 25% triaryl phosphates, available under the trademark FYROL® PBR from Akzo Nobel Chemicals Inc.; and "PEEOP", which is a poly-(ethylethyleneoxy) phosphate, of the type described in copending U.S. Ser. No. 08/677,283, having a molecular weight of about 915 (number average)/1505 (weight average), a typical hydroxyl number of under about 5.

Since the California 117 test requires passing two very different tests, the effect of each flame retardant package on each test must be considered. For example, at low densities it is easier to pass the smoldering test (Part D) and at higher density, it is easier to pass the flaming test (Part A). The Fyrol PBR brand additive generally performs better in the smoldering test than the Fyrol FR-2 additive. This is only important when the smoldering test becomes the limiting test to pass. In the following table the level to pass each test is shown as well as the overall test pass limit:(F=Flaming part A and S=Smolder part D).

The following data illustrates that relative performance of flame retardant additives varies with foam density as well as the test method used. The described blends give unexpected synergism in some of these combinations (as density increases less flame retardant additive is usually required to meet a specific test):

| | | | Passing FR Levels | | | |
|---|---|---|---|---|---|---|
| Product | TB-117 1.0 pcf | TB-117 1.5 pcf | TB-117 1.8 pcf | MVSS 302 1.0 pcf SENBR | MVSS 302 1.5 pcf SENBR | MVSS 302 1.8 pcf SENBR |
| FYROL® FR-2 | 16 F16 S<14 | 15 F15 59 | 13 F7 S13 | 16 | 15 | 7 |
| FYROL PBR | 15 F15 S4 | 12 F12 55 | 7 F7 S4 | 16 | 12 | 6 |
| PEEOP | 7 F S | 5 F5 S<5 | 5 F4 55 | 7 | 5 | 4 |
| FYROL FR-2: PEEOP *(1:1) | 12 F12 S<10 | 6 F6 S<5 | 6 F4 56 | 15 | 6 | 4 |
| 3:1 | 14 F14 S<8 | 9 F9 S6 | 6 F5 S6 | 14 | 6 | 4 |
| 10:1 | — | 15 F<12S15 | 8 F8 58 | — | 8 | 7 |
| FYROL PBR: PEEOP 3:1 | 12 F12 S11 | 9 F<8 S9 | 7 F7 S5 | | 5 | 5 |
| 10:1 | 14 F14 | 15 F<14S15 | 6 F7 S6 | 13 | 6 | 7 |

EXAMPLES 9–15

The following data illustrates the parts of flame retardant (PEEOP and/or FYROL FR-2 brand) needed to actually pass the MVSS 302 test in a 1.5 density foam and the theoretical, predicted amount:

| Flame Retardant | Actual | Theoretical |
| --- | --- | --- |
| 100% PEEOP | 5 | 5 |
| 1 PEEOP: 1 FR-2 | 6 | 10 |
| 1 PEEOP: 2 FR-2 | 7 | 11.7 |
| 1 PEEOP: 3 FR-2 | 6 | 12.5 |
| 1 PEEOP: 6 FR-2 | 8 | 13.6 |
| 1 PEEOP: 10 FR-2 | 8 | 14.1 |
| 100% FR-2 | 15 | 15 |

The above data demonstrate that for each of the tested blends, the actual amount of flame retardant needed to pass the test was unexpectedly lower than would be predicted from a simple arithmetic averaging of the expected level from evaluation of the amount needed to pass the test for each of the neat materials forming the tested blend.

EXAMPLES 10–14

The following data illustrates the parts of flame retardant (PEEOP and/or FYROL FR-2 brand) needed to actually pass the MVSS 302 test and the TB 117 tests in a 1.0 density foam:

| Flame Retardant | MVSS 302 | TB 117 |
| --- | --- | --- |
| 100% FYROL FR-2 | 16 | 16 |
| 3 FR-2: 1 PEEOP | 14 | 14 |
| 1 FR-2: 1 PEEOP | 15 | 12 |
| 3 PEEOP: 1 FR-2 | 15 | 15 |
| 100% PEEOP | 7 | 7 |

The following additional data was obtained:

| SAMPLE | Total % P to pass TB117 | Viscosity @ 25° C. (cps) | Density about 1.0 (pcf) | Air Flow ft³/min |
| --- | --- | --- | --- | --- |
| FYROL FR-2 (neat) | 1.14 | 1800 | 1.03 | 5.8 |
| FR-2/PEEOP 3:1 | 1.40 | 2400 | 0.96 | 6.1 |
| FR-2/PEEOP 1:1 | 1.56 | 1800 | 1.06 | 4.1 |
| PEEOP/FR-2 3:1 | 2.40 | — | 1.06 | 4.2 |
| PEEOP (neat) | 1.33 | 2300 | 1.00 | 4.6 |

EXAMPLES 15–19

The following data illustrates the parts of flame retardant (PEEOP and/or FYROL FR-2 brand) needed to actually pass the MVSS302 test and the TB 117 tests in a 1.8 density foam:

| Flame Retardant | MVSS 302 | TB 117 |
| --- | --- | --- |
| 100% FYROL FR-2 | 7 | 14 |
| 3 FR-2: 1 PEEOP | 4 | 6 |
| 1 FR-2: 1 PEEOP | 4 | 6 |
| 3 PEEOP: 1 FR-2 | 3 | 5 |
| 100% PEEOP | 4 | 5 |

The following additional data was obtained:

| SAMPLE ID | Total % P to pass TB117 | Total % P pass MVSS302 | Density about 1.8 (pcf) | Air Flow Ft³/min |
| --- | --- | --- | --- | --- |
| FYROL FR-2 (neat) | 0.99 | 0.50 | 1.89 | 5.2 |
| FR-2/PEEOP 3:1 | 0.60 | 0.40 | 1.84 | 5.4 |
| FR-2/PEEOP 1:1 | 0.78 | 0.52 | 1.85 | 6.0 |
| PEEOP/FR-2 3:1 | 0.80 | 0.48 | 1.78 | 6.2 |
| PEEOP (neat) | 0.95 | 0.76 | 1.85 | 6.0 |

EXAMPLES 20–24

The following data illustrates the parts of flame retardant (PEEOP and/or FYROL FR-2 brand) needed to actually pass the MVSS 302 test and the TB 117 tests in a 1.5 density foam:

| Flame Retardant | MVSS 302 | TB 117 |
| --- | --- | --- |
| 100% FYROL FR-2 | 15 | 15 |
| 3 FR-2: 1 PEEOP | 6 | 9 |
| 1 FR-2: 1 PEEOP | 6 | 6 |
| 100% PEEOP | 5 | 5 |

The following additional data was obtained:

| SAMPLE ID | Total % P to pass TB117 | Total % P to pass MVSS302 | Density about 1.5 (pcf) | Air flow ft³/mn |
| --- | --- | --- | --- | --- |
| FYROL FR-2 (neat) | 1.07 | 1.07 | 1.50 | 6.2 |
| FR-2/PEEOP 3:1 | 0.90 | 0.60 | 1.58 | 5.9 |
| FR-2/PEEOP 1:1 | 0.78 | 0.78 | 1.51 | 5.9 |
| PEEOP (neat) | 0.95 | 0.95 | 1.51 | 5.2 |

From an analysis of all of the foregoing data, a number of conclusions can be reached:

Generally speaking, an increase in the density of the foam will reduce the amount of flame retardant that is needed to pass a specific flame retardancy test.

There appeared to be no advantage to blending the FYROL FR-2 brand material with the PEEOP additive on a 1.0 density foam since the FR-2 additives passes the TB 117 test at 16 parts, the PEEOP at 7, and blends at 14–15.

At 1.5 and 1.8 foam density, blends (3:1) of the FR-2:PEEOP additives showed improvement over use of the neat FR-2 material since the blends passed the TB-117 test at 6 parts whereas the neat FR-2 material passed at 14 parts. The blend, while containing only 25% of the PEEOP component, is nearly as efficient as neat PEEOP (which passed at 4–5 parts in a 1.5 or 1.8 density foam) but would be much cheaper to produce due to the larger amount of the cheaper FR-2 material.

The 1:1 and 3:1 ratios of FR-2:PEEOP in a 1.5 density foam are of interest. The 1:1 ratio blend shows an advantage (pass: 6 parts in MVSS 302 test) over the use of the neat FR-2 material (pass: 15 parts). The 3:1 blend is equivalent (pass: 6 parts) in performance to the 1:1 ratio material but is cheaper because it contains a greater proportion of the cheaper FR-2 material. It is also advantageous to use the 3:1 ratio material in 1.8 density foam.

EXAMPLES 25–34

These Examples illustrate the flammability efficiency of the FYROL PCF brand and PEEOP flame retardants at two different ratios, 6:1 and 3:1, in a 1.5 pcf density foam. For example, a PCF/PEEOP blend at a 3:1 ratio does show a minimum level of synergistic efficiency, but the use of the FYROL PCF brand additive (also having poor fogging performance) is clearly less synergistic than the preferred FYROL FR-2 brand/FYROL PBR brand blends:

| Product | FR parts | Density (pcf) | Air Flow ft$_3$mn | Cal 117A Cal 117D% | MVSS 302 |
|---|---|---|---|---|---|
| FYROL PCF | 14 | 1.52 | 6.3 | 2.5"/Fail 65% | SE |
| FYROL PCF | 10 | 1.52 | 5.5 | 2.8"/Fail 65% | SENBR |
| PCF/PEEOP 6:1 ratio | 14 | 1.51 | 4.7 | 2.10"/Fail 75% | SE |
| PCF/PEEOP 6:1 ratio | 13 | 1.50 | 4.3 | 2.10"/Fail 74% | SE |
| PCF/PEEOP 6:1 ratio | 12 | 1.49 | 4.2 | 2.20"/Fail 76% | SE |
| PCF/PEEOP 6:1 ratio | 11 | 1.51 | 4.2 | 2.10"/Fail 85% | SE |
| PCF/PEEOP 3:1 ratio | 10 | 1.50 | 4.1 | 2.0"/3.1" 93% | SE |
| PCF/PEEOP 3:1 ratio | 9 | 1.49 | 4.3 | 2.2"/Fail 92% | SE |
| PCF/PEEOP 3:1 ratio | 8 | 1.48 | 4.0 | 2.0"/Fail 94% | SE |
| PCF/PEEOP 3:1 ratio | 7 | 1.51 | 4.2 | 2.0"/Fail 88% | SE |

The foregoing Examples merely illustrate certain embodiments of the present invention and, for that reason should not be construed in a limiting sense. The scope of protection that is sought is set forth in the claims that follow.

We claim:

1. A polyurethane foam that contains an effective amount for flame retardancy of a flume retardant blend consisting essentially of: (a) a monomeric halogenated organic flame retardant; and (b) an oligomeric organophosphate flame retardant having a phosphorus content of no less than 10%, by weight, and at least three phosphate ester units therein, the weight amount of (a) in the blend being no less than 60%, by weight of the blend.

2. A foam as claimed in claim 1 wherein flame retardant (a) in the blend is a halogenated phosphate ester.

3. A foam as claimed in claim 1 wherein flame retardant (a) in the blend comprises a polybrominated diphenyl oxide.

4. A foam as claimed in claim 1 wherein flame retardant (a) in the blend is a halogenated phosphate ester and is present at from 60% to about 95%, by weight of the blend.

5. A foam as claimed in claim 1 wherein flame retardant (a) in the blend is a polybrominated diphenyl oxide and is present at from 60% to about 95%, by weight of the blend.

6. A foam as claimed in any of claims 1–5 wherein the oligomeric organophosphate flame retardant in the blend is of the formula:

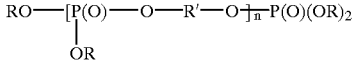

where n, on a number average basis, ranges from 2 to 20, and R is selected from the group consisting of alkyl and haloalkyl and R' is alkylene.

7. A foam as claimed in any of claims 1–5 wherein the oligomeric organophosphate flame retardant in the blend is of the formula:

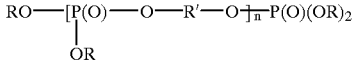

where n, on a number average basis, ranges from 2 to 20, and R and R' are ethyl and ethylene, respectively.

* * * * *

UNITED STATES PATENT AND TRADEMARK OFFICE
CERTIFICATE OF CORRECTION

PATENT NO. : 6,262,135 B1
DATED : July 17, 2001
INVENTOR(S) : Bradford et al.

Page 1 of 1

It is certified that error appears in the above-identified patent and that said Letters Patent is hereby corrected as shown below:

Claim 1,
Line 2, "flume" before "retardant" should read -- flame --.

Signed and Sealed this

Twenty-ninth Day of January, 2002

Attest:

Attesting Officer

JAMES E. ROGAN
*Director of the United States Patent and Trademark Office*